June 18, 1963 V. V. MARCHI 3,094,247
ELECTRIC-SELECTION MULTI-RESERVOIR LIQUID DISPENSER
Filed Oct. 10, 1960 4 Sheets-Sheet 1
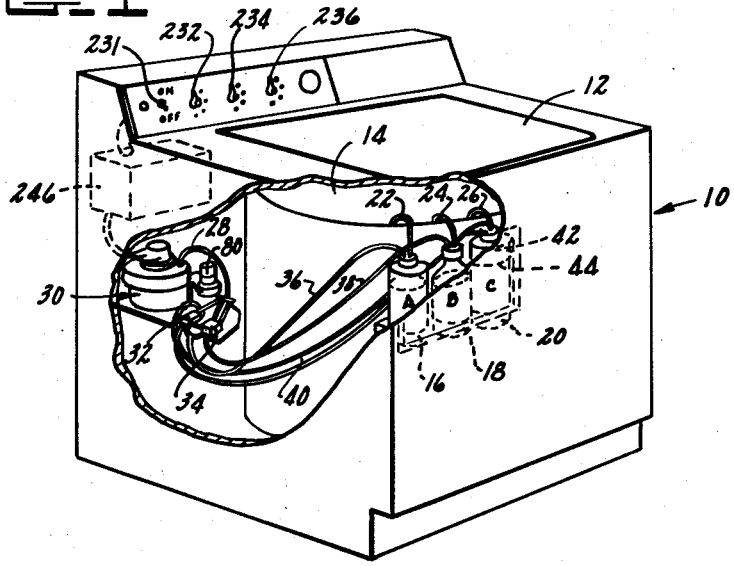
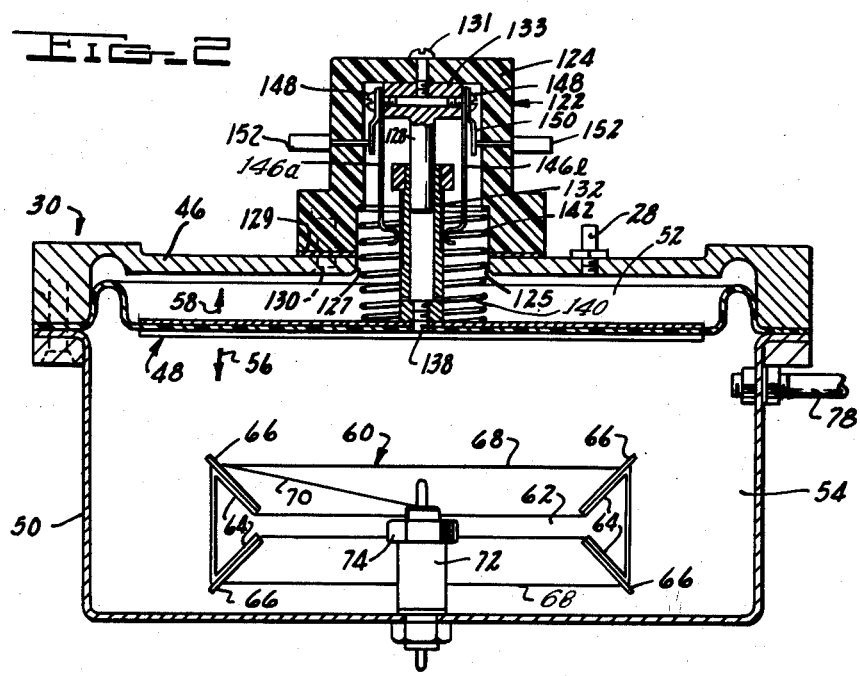
INVENTOR.
VITO V. MARCHI
BY
WILSON, SETTLE, McRAE & CRAIG
ATTORNEYS June 18, 1963 V. V. MARCHI 3,094,247
ELECTRIC-SELECTION MULTI-RESERVOIR LIQUID DISPENSER
Filed Oct. 10, 1960 4 Sheets-Sheet 2
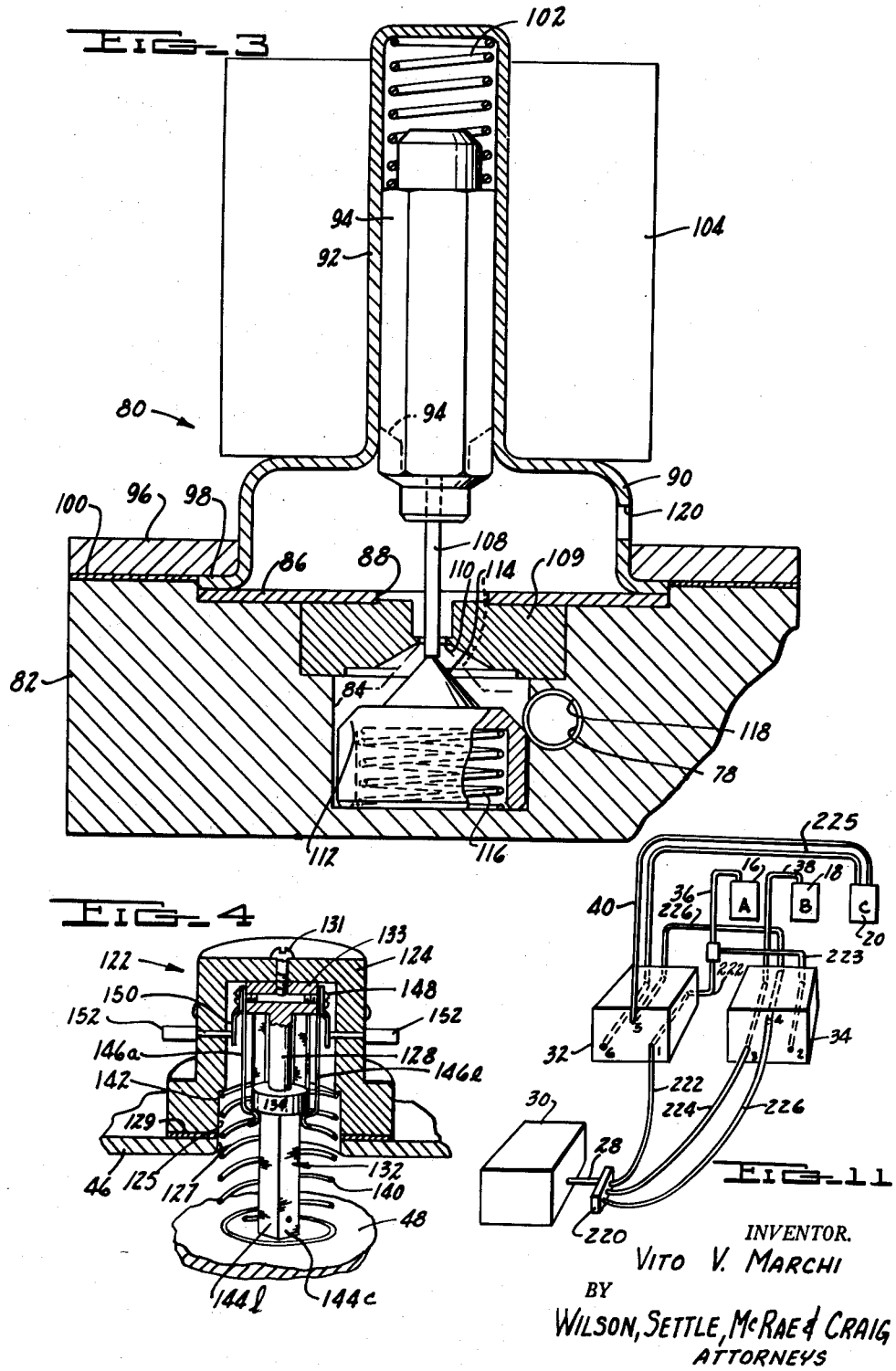
INVENTOR.
VITO V. MARCHI
BY
WILSON, SETTLE, McRAE & CRAIG
ATTORNEYS June 18, 1963
V. V. MARCHI
3,094,247
ELECTRIC-SELECTION MULTI-RESERVOIR LIQUID DISPENSER
Filed Oct. 10, 1960
4 Sheets-Sheet 3
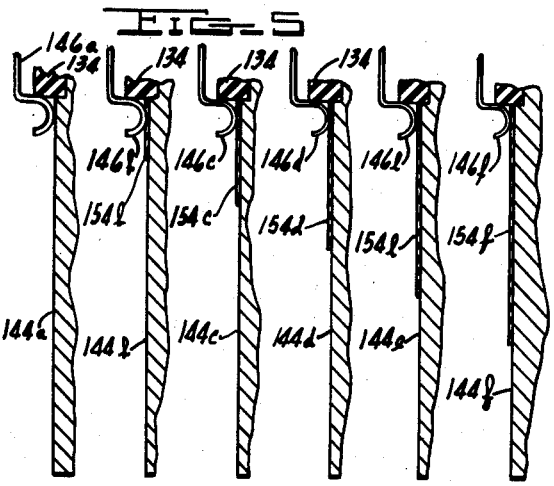
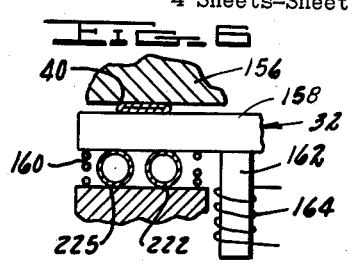
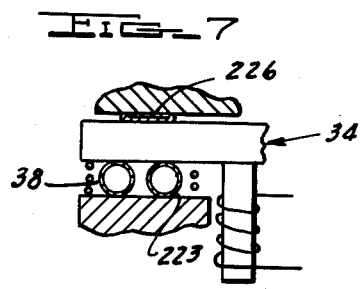
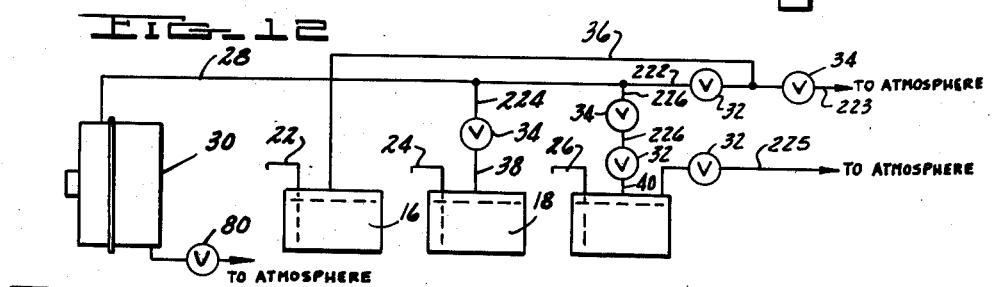
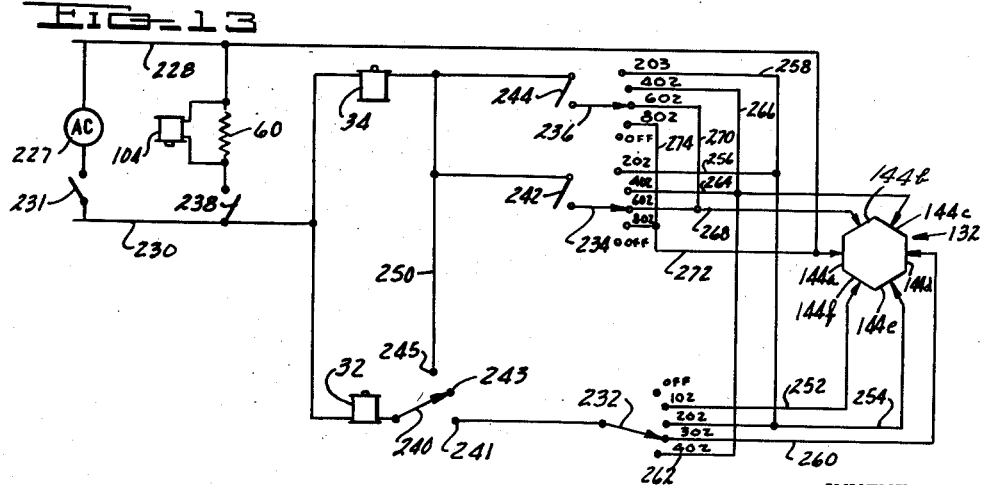
INVENTOR.
VITO V. MARCHI
BY
WILSON, SETTLE, McRAE & CRAIG
ATTORNEYS June 18, 1963 V. V. MARCHI 3,094,247
ELECTRIC-SELECTION MULTI-RESERVOIR LIQUID DISPENSER
Filed Oct. 10, 1960 4 Sheets-Sheet 4
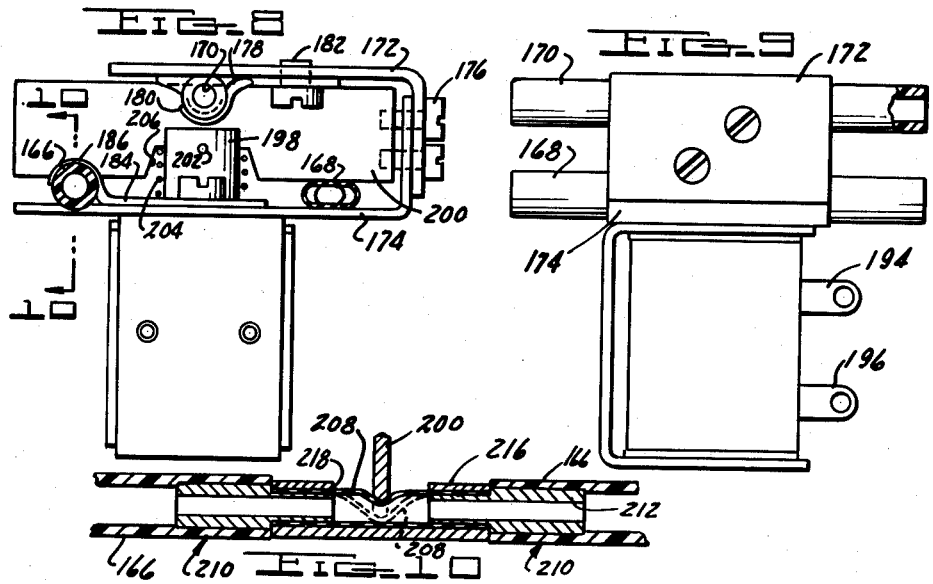
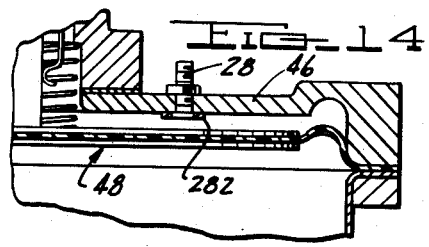
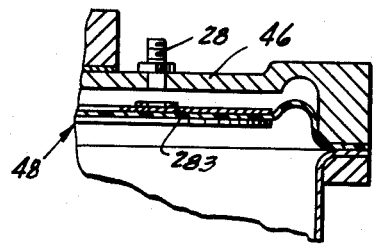
INVENTOR.
VITO V. MARCHI
BY
WILSON, SETTLE, McRAE & CRAIG
ATTORNEYS

United States Patent Office 3,094,247
Patented June 18, 1963

3,094,247
ELECTRIC-SELECTION MULTI-RESERVOIR LIQUID DISPENSER
Vito V. Marchi, Redwood City, Calif., assignor to American Radiator & Standard Sanitary Corporation, New York, N.Y., a corporation of Delaware
Filed Oct. 10, 1960, Ser. No. 61,721
10 Claims. (Cl. 222—54)

This invention relates to an apparatus for dispensing predetermined quantities of liquid agent. More particularly, the invention relates to a dispenser capable of dispensing liquid agent in metered amounts from a plurality of different reservoirs by means of a pumping action developed by the thermal expansion of a contained fluid body.

The present invention is particularly suited for use in connection with automatic domestic washing machines, as for example, clothes washing machines or dishwashing machines. It may conveniently be integrated into the time-cycle control system which directs the machine in a program in which the articles contained therein are washed, rinsed and dried. The liquid agent dispensed may be, for example, a wetting agent, a liquid detergent, bleach, or the like.

The invention is particularly characterized in that it may be used to dispense material from a selected one of a plurality of reservoirs, each reservoir containing a different liquid agent. A further important characteristic of the dispenser is that it includes means for accurately controlling the amount of liquid agent dispensed, which means may be controlled remotely by the timer mechanism of the machine.

An object of the invention is to provide dispensing apparatus which may be operably connected to different reservoirs to dispense different agents into a washing machine.

An important object of the invention is to provide electrical control means for setting the volume of liquid agent dispensed.

Another object of the invention is to provide novel valve means for facilitating the selection of the type of liquid and amount to be dispensed.

A further object is to provide dispensing apparatus which incorporates a minimum number of moving parts, thereby promoting a long service life.

Another object of the invention is to provide an apparatus for dispensing corrosive materials such as wash additives, wherein air or non-corrosive medium is used as a pumping mechanism to avoid dissolving by the corrosive materials, it being appreciated that valves for corresive materials must be constructed of high-cost non-corrosive metal.

A further object of the invention is to provide a dispensing apparatus wherein the component parts of the apparatus are disposable in locations remote from one another, in order to permit mounting of the apparatus in different makes and models of washing machines.

A still further object of the invention is to provide apparatus for dispensing predetermined quantities of material by the application of heat, the apparatus being particularly designed so that inadvertent input of excessive quantities of heat is ineffective to cause damage to component parts of the mechanism.

Another object is to provide such dispensing apparatus which is of "fail-safe" construction.

A further object is to provide an electrically powered dispensing apparatus having a design whereby it is capable of discharging a relatively large volume of material with a relatively low current consumption, thereby promoting long contact life of the switch mechanism used to control the dispensing operation.

Other objects of this invention will appear in the following description and appended claims, reference being had to the accompanying drawings forming a part of this specification wherein like reference characters designate corresponding parts in the several views.

In the drawings:

FIG. 1 is a perspective view of a clothes washing machine with a portion of the casing removed to show a typical mounting arrangement for the dispenser structure of the present invention;

FIG. 2 is a side elevational view in section of the dispenser pumping apparatus utilized in the FIG. 1 construction;

FIG. 3 is a side elevational view in section of the solenoid-operated valve mechanism utilized to vent the heater chamber of the pump of FIG. 2;

FIG. 4 is a perspective view in section of a slide switch mechanism, shown in FIG. 2, and utilized to control the amount of liquid agent dispensed from a reservoir during a dispensing operation;

FIG. 5 is a diagrammatic view of the switch contacts of the FIG. 4 slide switch mechanism;

FIG. 6 is a diagrammatic view of one pinch valve assembly utilized to facilitate the selection of a particular dispenser reservoir for a dispensing operation and to control the amount of agent dispensed;

FIG. 7 is a diagrammatic view of a second pinch valve assembly used in association with the pinch valve assembly of FIG. 6;

FIG. 8 is a front elevational view of a pinch valve, partly in section, to perform the function of the valve assembly shown diagrammatically in FIGS. 6 and 7;

FIG. 9 is a side elevational view of the pinch valve shown in FIG. 8;

FIG. 10 is a sectional view taken substantially along the line 10—10 of FIG. 8 looking in the direction of the arrows and showing the operation of the pinch valve blade;

FIG. 11 is a diagrammatic view showing the pinch valves, the reservoirs, the dispenser pump and the interconnecting air tubes;

FIG. 12 is a diagrammatic view showing the valve and air tube circuitry;

FIG. 13 is a schematic view showing the various electrical connections and switching mechanisms utilized to operate the dispenser;

FIG. 14 is a sectional view showing one embodiment of sealing means utilized to seal the outlet from the pumping chamber during a dispensing operation; and FIG. 15 is a second embodiment shown in section of sealing means similar to FIG. 14.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The dispensing apparatus illustrated in the drawings is similar in many respects to the dispensing apparatus in co-pending application, Serial No. 772,503, filed November 7, 1958. The apparatus may be mounted in a conventional clothes washing machine 10 as shown in FIG. 1, having a tub access closure 12 overlying a clothes washing machine tub 14. The washing machine 10 is equipped with three liquid agent dispenser reservoirs 16, 18, 20, which may contain such liquid additives as detergents and wetting agents. Flexible conduits 22, 24, 26 extend from the reservoirs 16, 18, 20, into a position for discharging into tub 14. A flexible tube 28 leads from the pumping chamber of pumping apparatus 30, is divided into three branches which are led into a pair of pinch valves 32, 34 and eventually are divided into three separate flexible tubes 36, 38, 40, each of which leads to an air space 42 in the upper portion of the reservoirs.

In operation, contained air is displaced from the pump to air space 42, causing the liquid 44 within the reservoirs to be displaced, thereby forcing a portion of the liquid 44 from the reservoir through tubes 22, 24, 26 into washing machine tub 14.

The pumping apparatus 30 is shown in FIG. 2. The mechanism includes a casing member 46 closed by a diaphragm structure 48. A second casing member 50 overlies diaphragm 48, the arrangement of the two casing members and diaphragms serving to define a pumping chamber 52 and a heater chamber 54, the two chambers 52, 54 being of inversely varying volume (i.e., when the diaphragm moves in the direction of arrow 56, the chamber 52 volume is increased and the chamber 54 volume is decreased, and conversely when the diaphragm moves in the arrow 58 direction the chamber 54 volume is increased and the chamber 52 volume is decreased).

An electrical resistance heater 60 is provided within the heater chamber 54 to heat the trapped air in this chamber to cause expansion of the air for forcing diaphragm 48 in the arrow 58 direction. Movement of the diaphragm 48 in the direction of the arrow 58 causes displacement of air from the pumping chamber 52. The displaced air moves out through tube 28 to eventually cause displacement of fluid from the dispenser reservoirs.

Heater 60 preferably comprises a pair of end plates 62, each having four angularly turned flanges 64 which fixedly engage mica strip 66. Each of the mica strips is provided with a series of notches along its length to receive resistance wire 68, said wire being wrapped around the strip and having its end portions 70 connected to insulated terminals 72 carried on turned out portion 74 and the end plates 70. The terminals extend through openings in casing member 50 to receive leads (not shown) for energization of the heater.

It will be noted that the heater wires 68 are located centrally within chamber 54 (as opposed to being located on an exterior wall). The heater wires are entirely surrounded by the chamber 54 air (they are not embedded in their structure), and the mass of the support structure 62, 66 is very low so as to extract very little heat during heater energization. These factors insure a rapid heating of the chamber 54 air with a very low heater temperature. The low heater temperature is of importance because of the low wattage required and the freedom from dangerous temperature and pressure conditions in the event of inadvertent heater energization over a prolonged time.

The heater chamber 54 is provided with a vent fitting having a vent tube 78 for the purpose of venting the heater chamber during periods of non-use. The tube 78 leads to a valve structure 80 as may be seen in FIG. 1.

Details of the valve structure 80 are shown in FIG. 3. The structure 80 comprises a casing member 82 having a centrally located recess 84 therein. The recess 84 is covered by a plate 86 having a central opening 88. A cup-shaped member 90 is positioned on the plate 86 and has a hollow outwardly extending projection 92 to carry a solenoid armature 94. Upper casing member 96 fits around the cup-shaped member 90 and holds the assembly in place by abutting against annular flange 98. Casing member 96 may be secured in place by any suitable means such as screws (not shown). A gasket 100 is provided between the two casing members 82, 96 to seal the assembly.

The solenoid armature 94 is provided with a load spring 102 which urges the armature downwardly to assume a normal position as shown in full lines. Upon energization of the solenoid coil 104, the armature 94 will move upwardly, overcoming the force of the spring 102 to move to the position shown in dotted lines. A stem 108 is carried on the lower end of the armature 94 and extends into the recess 84. The recess 84 has an enlarged portion which carries an insert 109 having valve seat 110. A valve element 112 is provided within the recess 84 and has a conical portion 114 to seat against the valve seat 110. Spring 116 urges the valve element 112 to seat in the seat 110. An inlet port 118 communicates with the recess 84. The tube 78 (which extends from the pump heater chamber) is connected to the inlet port 118. An outlet port 120 to atmosphere is provided in the cup member 90.

In operation, the solenoid coil 104 is normally de-energized. The load spring 102, being stronger than the relatively weak spring 116, moves the plunger 94 downwardly to force the valve element 112 to the open position as shown in full lines. Communication is thus established between the inlet port 118 and the outlet port 120 to atmosphere, thus venting the heater chamber. When it is desired to seal the heater chamber to permit dispensing to take place, the coil 104 is energized, thus moving the armature 94 upwardly and permitting the spring 116 to move valve element 112 upwardly (as shown in dotted lines) whereby the conical section 114 will seat in the seat 110.

When the heater chamber 54 is sealed from atmosphere, and the heater 60 is energized, the air temperature rise in the heater chamber causes expansion of the entrapped air. Expansion of the entrapped air moves the diaphragm 48 to thereby displace air in the pumping chamber 52 out through the tube 28. This air is directed by means of the valves 32, 34, either to the atmosphere, in which case no useful work will result, or to one of the air tight reservoirs 16, 18, 20, in which case the rise in air pressure within the reservoirs will cause the reservoir fluid to be displaced.

This arrangement is utilized to permit dispensing of different quantities of fluid from the reservoirs. For example, to dispense fluid equivalent to one-half of the pump maximum capacity, the air displaced during the first half of the diaphragm movement merely needs to be dispelled to the atmosphere, while that displaced during the second half is used for displacing reservoir fluid. Valves 32 and 34, and a slide switch 122 are provided to accomplish this metering step.

The pinch valves 32, 34 which are controlled by the switch 122 are shown diagrammatically in FIGS. 6 and 7. As both valves have the same structure, only the valve 32 will be described.

As shown, a housing member 156 is provided in which is reciprocally mounted a pinch blade 158. The pinch blade 158 is normally urged to the position shown by means of a spring 160. A solenoid, shown as an armature 162 in coil 164 is provided to move the blade 158 in the opposite direction upon energization. A pair of flexible air tubes 222, 225 extend beneath the blade 158, while a third tube 40 is positioned above the blade 158. Positionment of the blade as shown closes the upper tube 40 and permits the lower tubes 222, 225 to expand to the open position permitting communication through the lower tubes but preventing communication through the upper tube. Energization of the coil 164 will move the armature 162 downwardly to thus move the blade 158 to close the lower tubes 222, 225 and permit the upper tube 40 to open.

As will be appreciated, there are four possible combinations of open and closed tubes when two pinch valves are used. One combination is to close the upper tube of both pinch valves, the second combination is to close both lower tubes of each pinch valve, and the third combination is to close the upper tube of one pinch valve while keeping the upper tube of the other valve open, and the fourth combination is the reverse of the third combination.

An embodiment of a suitable pinch valve is shown in FIGS. 8, 9, and 10. The assembly comprises a pair of L-shaped brackets 172, 174 which are secured together by means of screws 176. Mounted on the underside of the upper bracket 172 is a tube retaining bracket 178 which has an arcuate portion 180 for holding the tube 170. The bracket 178 is held in place by means of a screw 182. The lower tubes 166, 168 are held in place by means of a tube retaining bracket 184 which has a pair of arcuate portions 186 for holding the tube in place. A solenoid 190 having a coil with terminals 194, 196 is carried on the lower bracket 174. The plunger 198 of the solenoid extends through the bracket 174 and is secured at its outer end to pinch blade 200 by means of a pin 202. A spring 204 is provided and is inserted into recess 206 of the pinch blade to normally urge the blade to the uppermost position. As shown, the solenoid has been energized, and has moved to a position to partially pinch the lower tubes 166, 168. When the blade has been completely retracted, it will pinch the tubes entirely as shown in FIG. 10 in dotted lines.

The tubes may each be provided with a portion 208 of less wall thickness than the remainder to permit easy collapsing by the pinch blade. As may be seen in FIG. 10, a metal adapter tube 210 is provided having a portion 212 for insertion into the thick wall flexible tube and a portion of reduced diameter 214 for insertion into the thin wall tube 208. A metal sleeve 216 surrounds the thin wall tube 208 to support it. The sleeve 216 has an opening 218 for the insertion of the pinch blade.

The connection between the pump 30, pinch valves 32, 34, and dispenser reservoirs 16, 18, and 20 it diagrammatically illustrated in FIG. 11. As there shown, the tube 28 leading from the pumping chamber is subdivided into three branches by means of an adapter 220. One branch 222 extends through valve 32. The branch 222 exits from the valve 32 and is sub-divided into two branches 36, 223 one 223 of which is led through the valve 34. The branch 223 exits from the valve 34 and is open to atmosphere at that point. The second sub-branch 36 extends to the airspace in reservoir 16 as previously mentioned.

The second branch 224 of tube 28 is led through the valve 34 and exits therefrom in the form of tube 38 which leads into the air space of reservoir 18. The third branch 226 is led into valve 34 and exits therefrom into valve 32. The branch 226 exits from valve 32 in the form of tube 40 and leads into the airspace of reservoir 20. A tube 225 is also provided leading from reservoir 20 into valve 32. The tube 225 exits from valve 32 and is open to atmosphere at that point.

The entire circuitry and operation of the air pump means is best seen in FIGS. 6, 7 and 12. The A indicates the four positions which the pinch valves may assume and indicates the respective condition of the tube within the valves for each position.

*Table A*

|  | Off Position Reservoirs, Pump and Heater Chambers Vented | Discharge From Reservoir 16 | Discharge From Reservoir 18 | Discharge From Reservoir 20 |
|---|---|---|---|---|
| Solenoid Pinch Valve 32 | Off | On | Off | On |
| Solenoid Pinch Valve 34 | Off | Off | On | On |
| Tube 223 | Open | Open | Closed | Closed |
| Tube 222 | Open | Closed | Open | Closed |
| Tube 225 | Open | Closed | Open | Closed |
| Tube 40 | Closed | Open | Closed | Open |
| Tube 226 | Closed | Closed | Open | Open |
| Tube 38 | Open | Open | Closed | Closed |

As may be seen, when both pinch valve solenoids are de-energized, the pump chamber and reservoirs are vented to atmosphere. Reservoirs 16, 18 and the pump chamber are vented to atmosphere through tube 223. Reservoir 20 is vented to atmosphere through tube 225. Energization of the solenoid of pinch valve 32 will cause dispensing from reservoir 16. The closed tubes 38 and 226 prevent dispensing from reservoirs 18 and 20, and the closed tube 223 prevents venting to atmosphere. When the solenoid of pinch valve 32 is de-energized and the solenoid of pinch valve 34 is energized, dispensing will take place from reservoir 18. As will be noted, closed tubes 222 and 226 prevent dispensing from either reservoirs 16 or 20 and closed tube 222 also prevents venting the pumping chamber to atmosphere. When both solenoid pinch valves are energized, dispensing will take place from reservoir 20. Closed tubes 222 and 38 prevent dispensing from reservoirs 16 and 18, while open tubes 226 and 40 permit dispensing from reservoir 20.

As previously mentioned, the pinch valves are controlled by a slide switch 122 which is best seen in FIGS. 2, 4 and 5. Switch 122 comprises a hollow switch housing member 124 having an opening 125 in one end which registers with an opening 127 provided in the pump casing member 46. The housing and pump casing, with a sealing gasket 129 therebetween, are held together by means of screws 130.

A guide member 128 is mounted within housing 124 by means of a screw 131. The guide member 128 is fabricated from an electrically insulating material such as nylon. Slidingly received on the guide 128 is a hollow switch member 132 which is fabricated from an electrically conductive material. The switch member 132 is provided with an enlarged stop element 134 at its upper end. The stop element 134 is fabricated from an electrically insulating material.

The lower end of the switch member 132 is secured to the pump diaphragm structure by a screw 138. When the pump is not in operation, the diaphram 48 assumes the positionment shown in FIG. 2, and is always urged into this position by spring 140 which abuts against shoulder 142 of housing member 124. This is the initial or starting position of the switch mechanism.

The switch member 132 is provided with six exterior faces 144a–f each of which is contacted by a spring contact arm 146a–f. The contact arms are secured by screws 148 to the enlarged portion 133 of guide 128 and are insulated from each other. Each contact arm is provided with a backturned portion 150 which electrically engages a different terminal 152 extending through the wall of the housing 124. In operation, the terminal associated with contact arm 146a is connected to one side of a power source and contact is made to that side of power by the other contact arms through the conductive switch member 132 and thence through contact arm 146a.

The faces of switch member 132 and their associated contact arms are shown diagrammatically in FIG. 5. As will be noted, the first face 144a is in immediate electrical contact with the contact arm 146a. The second face 144b is provided with an electrical insulating material 154b, the arm 146b consequently not making initial contact with the face. The third face 144c is provided with insulation 154c of slightly longer length than the insulation 154b. Each face in turn is provided with insulation 154d, 154e, and 154f of slightly longer length than the preceding insulation. As a consequence, the arms 146d, 146e and 146f do not make electrical contact with their respective faces until each face is moved a little further along (face movement, of course, being caused by movement of diaphragm 48). With this arrangement, it is possible to dispense a selected one of six different metered amounts of fluid from a reservoir as will be later described.

The electrical circuitry for controlling the entire pumping and dispensing system is illustrated in FIG. 13. Power 227 is applied across lines 228, 230 by closing switch 231. Application of power to the pinch valve solenoids, the pump heater, and to the various dispenser switches 232, 234, 236 is controlled by timer switches 238, 240, 242 and 244. The timer switches are controlled by a conventional timer mechanism 246 (FIG. 1) which also controls other elements of the washing machine. Such timers conventionally employ cam operated switches whereby the cams turn the switches off and on at appropriate points in the washing cycle.

The timer switch 238 controls the application of power to the heater 60 and the coil 104 of the vent valve structure 80. Timer switch 240 controls the application of power to line 248 leading to dispenser switch 232 and also controls the application of power to line 250 which leads to dispenser switches 234, 236. As will be noted, each of the dispenser switches is a five place selector switch, having an off position and four dispensing positions. The dispensing positions are indicated as being capable of dispensing various amounts of fluid from the dispenser, expressed in ounces. As will be noted in FIG. 1, the dispenser switches may be conveniently mounted on the panel of the washing machine.

Referring to dispenser switch 232, it will be noted that this switch has a one ounce, two ounce, three ounce and four ounce position. Lead 252 leads from the one ounce position to face 144f. Lead 254 extends from the two ounce position to face 144e. As will be noted, leads 256 and 258 extend from the two ounce positions of switches 234 and 236 to also contact face 144e. Lead 260 extends from the three ounce position to face 144d. Lead 262 extends from the four ounce position to face 144c. As will be noted, leads 264 and 266 extend from the four ounce positions of the switches 234 and 236 to also contact face 144c.

Referring next to switch 234, it will be seen that the six ounce position is connected to face 144b by means of lead 268. Lead 270 of switch 236 also connects to face 144b by means of the lead 268. The eight ounce position of switches 234 and 236 connect to the face 144a by means of the leads 272 and 274.

As will be appreciated, the dispenser switches can be positioned, either manually or by a suitable timer connection, to dispense the desired amount of fluid from the reservoirs. Dispensing action will take place when the proper timer switch has been closed to close the circuit through the dispenser selector switch.

The pinch valve solenoids are controlled by timer switches to provide for dispensing from the correct reservoir. As will be noted from the table, when it is desired to dispense from reservoir 16, solenoid 32 should be energized while solenoid 34 should be de-energized. This is accomplished by closing solenoid timer switch 240 on contact 241 to complete a circuit through lead 248. The circuit through solenoid 32 will then be through lead 248 from one side of power, thence through the switch 232 and through the slide switch back to power through lead 228. During this time, solenoid 34 is de-energized because both the timer switches 242, 244 are open. When it is desired to dispense from reservoir 18, timer switch 240 is moved to the center contact 243 breaking the circuit through solenoid 32 to cause de-energization thereof. Switch 244 is closed to cause the required energization of solenoid 34.

Dispensing from reservoir 20 is accomplished by energizing both solenoids 32, 34. This is done by moving switch 240 to its third contact 245 and closing switch 242.

It is believed that the operation of the entire control system may be understood by one illustrative example. Assume that two ounces of fluid are to be dispensed from reservoir 16. Timer switch 238 is closed to actuate the heater 60 and energize vent valve solenoid coil 104 to thus seal the heater chamber. Timer switch 240 is moved to contact 241 thus completing a circuit through pinch valve solenoid 32 and dispenser switch 232. Dispenser switch 232 is moved to the two ounce position.

As the air in the heater chamber expands, it will force diaphragm 48 in the arrow 58 direction. The air displaced from the pumping chamber 52 will be initially vented to atmosphere through the pinch valves because the solenoids 32, 34 are at this time de-energized. As the diaphragm moves, it will carry switch member 132 along with it. When the insulated portion of face 144e has passed the contacting portion of switch arm 146e, switch arm 146e will make electrical contact with switch member 132. This will cause a circuit to be completed through pinch valve solenoid 32. The air displaced from the pumping chamber will no longer be vented to atmosphere but will be directed to air space 42 of reservoir 16 to thus cause the dispensing therefrom of two ounces of material. The amount dispensed is, of course, determined by the amount the diaphragm 48 moves after solenoid 32 is energized.

Referring now to FIGS. 14 and 15, means are there shown for sealing the outlet from the pumping chamber at the end of diaphragm 48 movement. As will be noted in FIG. 14, a sealing ring 282 is secured to the underside of the casing. The seal may be secured for example by a conventional cement or adhesive material. Optionally, an O-ring may be cemented in a groove provided around the periphery of the opening. A seal 283 may alternatively be provided on the diaphragm as illustrated in FIG. 15. The function of the seal is to close the outlet tube at the end of the dispensing operation. The seal permits cessation of pumping of fluid from the reservoir when the diaphragm reaches the end of the normal stroke. Bleeding of fluid from the reservoir might otherwise occur due to thermal expansion of the small volume of air entrapped in the slide switch mechanism. Alternative to providing a seal, the slide contact can be insulated at both the beginning and end of their stroke so that the pinch valves will be energized only during actual dispensing.

In the foregoing description of the dispenser, a preferred pinch valve construction, slide switch and heater chamber vent valve construction have been shown. However, it will be appreciated that other structures could be used to accomplish the functions of the structures shown. For example, a four-way valve could be substituted for the pinch valves.

Reference has heretofore been made to the "fail-safe" character of the apparatus. The "fail-safe" operation is made possible by the design wherein thermal energy is applied to the gas within the heater chamber by means of heater 60. The heater is a low-power unit which is sufficiently fast acting for satisfactory operation in the illustrated construction. However, if for any reason the heater switch should fail to de-energize the heater circuit, the design of the apparatus is such that the increased gas pressure in the heater chamber will not cause damage to the mechanism. In actual operation, excessively long energization of the heater causes heat to be lost to the ambient atmosphere. This lost heat balances the heat within the chamber so as to provide a ceiling on the chamber temperature. There is thus provided a "fail-safe" construction which operates without part damage in the event of inadvertent heater energization.

Having thus described my invention, I claim:

1. A combination comprising at least one closed liquid reservoir; a discharge conduit leading from the liquid contents of said reservoir; a contained gas in contact with said liquid contacts; and pump means to displace said contained gas to in turn displace said liquid contents to dispense a portion thereof out of the discharge conduit; said pump means comprising an expansible gas chamber in contact with the contained gas; means to thermally expand the gas in said chamber to cause chamber expansion with resultant displacement of the contained gas; electrical switch means in operative relationship with said chamber for actuation responsive to chamber expansion; and valve means associated with said closed liquid reservoir; said valve means being controlled by the electrical switch means to selectively vent the contained gas to permit metering the amount of liquid contents dispensed.

2. The combination comprising at least one closed liquid reservoir; a discharge conduit leading from the liquid contents of said reservoir; a contained gas acting on said liquid contents; and pump means to displace said contained gas to in turn displace said liquid contents to dispense a portion thereof out of the discharge conduit; said pump means comprising movable wall means in contact with the contained gas; means to move the wall means to displace the contained gas; electrical switch means in operative relationship with said movable wall means for actuation responsive to movement of the wall means; and valve means associated with said closed liquid reservoir; said valve means being controlled by the electrical switch means to selectively vent the contained gas to permit metering of the amount of liquid contents dispensed.

3. The combination comprising a plurality of closed liquid reservoirs; a discharge conduit leading from the liquid contents of each reservoir; a contained gas acting on the liquid contents of each reservoir; and pump means to displace said contained gas to in turn displace said liquid contents to dispense a portion thereof out of the discharge conduits; said pump means comprising movable wall means in contact with the contained gas; means to move the wall means to displace the contained gas; valve means associated with said closed liquid reservoir to facilitate dispensing from a selected one of the reservoirs; switch means associated with the pump wall means and having a switch member movable therewith; said switch means being operative at different preselected distances of wall movement to actuate the valve means to selectively vent the contained gas to permit metering the amount of liquid contents dispensed.

4. A device as claimed in claim 3 and further characterized in that said valve means comprise pinch valve structure having collapsible tubes and a solenoid actuated blade member to collapse selected ones of the tubes to close the selected tubes against passage of gas therethrough; said tubes establishing communication between the pump means and the contained gas in the reservoirs.

5. The combination comprising a plurality of liquid reservoirs; a discharge conduit leading from the liquid contents of each reservoir; a contained gas in contact with said liquid contents of each reservoir; and pump means to displace said contained gas to in turn displace said liquid contents to dispense a portion thereof out of the discharge conduit; said pump means comprising movable wall means in contact with the contained gas; means to move the wall means to displace the contained gas; valve means to selectively vent the contained gas to permit metering of the amount of liquid contents dispensed; and switch means to control the operation of the valve means; said switch means comprising an electrically conductive switch member operatively connected to the movable wall means for movement therewith; a plurality of electrically conductive faces of different lengths on said switch member; and an electrical contact arm associated with each face; each of said contact arms contacting the electrically conductive face at a different point in switch member movement, each of said contact arms being selectively connectible to the valve means for control thereof.

6. The combination comprising a plurality of closed liquid reservoirs; a discharge conduit leading from the liquid contents of each reservoir; and pump means to displace said liquid contents to dispense a portion thereof out of the discharge conduits; said pump means comprising a housing structure having a movable wall member therein dividing the interior of the housing structure into first and second air chambers; means to control the extent of movement of the wall member; means to thermally expand the air in said first chamber to move the movable wall member and reduce the volume of said second chamber to displace the air contained therein; conduit means connecting each reservoir with said second chamber; valve means for each of said conduit means; and electrical switch means to selectively open said valve means to provide air communication between the second chamber and a selected one of the reservoirs; said electrical switching means comprising an electrically conductive switch element associated with the movable wall member and movable therewith; and said switch element having electrically conductive faces of different lengths; an electrical contact arm associated with each face; each of said contact arms making electrical contact with the associated face at a different point in the movement of the switch element; the contact arms being operative, upon making contact with the switch element face, to cause dispensing from the selected reservoir; the amount of material dispensed being related to the length of the contacted switch element face.

7. A device as claimed in claim 6 and further characterized in that the movable wall means is a diaphragm.

8. A device as claimed in claim 6 and further characterized in the provision of means to vent to atmosphere the first and second chambers and the liquid reservoirs subsequent to a dispensing operation; and resilient means to return the movable wall member to its initial position upon such venting.

9. A device as claimed in claim 6 and further characterized in the provision of a sealing member to seal the second chamber of the pump from the reservoirs at the termination of movement of the movable wall member.

10. The combination comprising a washing machine casing having a tub therein; and a liquid dispensing device within said casing; said dispensing device comprising a plurality of closed liquid reservoirs; a discharge conduit leading from the liquid contents of each reservoir into said tub; and pump means to displace said liquid contents to dispense a metered portion thereof out of the discharge conduits into the tub; said pump means comprising a housing structure divided into first and second air chambers by a movable wall member; means to control the extent of movement of the wall member; means to thermally expand the air in said first chamber to move the movable wall member and reduce the volume of said second chamber to displace the air contained therein; conduit means connecting each reservoir with said second chamber; valve means for said conduit means; electrical switch means to selectively open said valve means to provide air communication between the second chamber and a selected one of the reservoirs; said switch means being operative to cause the valve means to vent the contained gas to atmosphere during a portion of the movement of the movable wall means to permit metering of the amount of liquid contents dispensed.

References Cited in the file of this patent

UNITED STATES PATENTS

| | | |
|---|---|---|
| 1,576,982 | Mass | Mar. 16, 1926 |
| 2,867,224 | Martiniak et al. | Jan. 6, 1959 |
| 2,907,495 | Brous | Oct. 6, 1959 |
| 2,948,436 | Federighi et al. | Aug. 9, 1960 |
| 2,975,945 | Anderson et al. | Mar. 21, 1961 |